United States Patent Office.

CARL DUISBERG, OF BARMEN, PRUSSIA, GERMANY.

COLORING-MATTER OBTAINED FROM TETRAZO-DITOLYL.

SPECIFICATION forming part of Letters Patent No. 329,632, dated November 3, 1885.

Application filed July 29, 1885. Serial No. 172,981. (Specimens.)

*To all whom it may concern:*

Be it known that I, CARL DUISBERG, residing at Barmen, in the Kingdom of Prussia and Empire of Germany, have invented a new and useful Improvement in the Manufacture of Dye-Stuffs or Coloring-Matters, of which the following is a specification.

My invention relates to the production of a new red color for dyeing on cotton by the action of tetrazo-ditolyl upon naphthionic acid, (alpha-naphthylamine sulpho-acid.)

In order to obtain my new color practically, I proceed as follows: Ten (10) kilos toluidine sulphate (produced by the alkaline reduction of the technical nitro-toluol and boiling of the so-obtained hydrazo-toluol with concentrated acids) are suspended in a finely-comminuted condition in one hundred and fifty liters water. To this twenty kilos of muriatic acid of 21° Baumé are added, and when this solution is cooled by ice 4.4 kilos sodium nitrite dissolved in water are gradually added. In this way a reddish-yellow solution of tetrazo-ditolyl chloride is formed. This solution is now added to twelve kilos naphthionic acid (alpha-naphthylamine sulpho-acid) suspended in a finely-comminuted condition in water, and acetate of soda is added until the solution has a feeble scent of acetic acid, (until all free mineral acid present has been replaced by acetic acid.) Now the dark-brown precipitate formed is allowed to stand for about twenty-four hours, while repeatedly stirred, filtered, washed with cold water, and by treatment with soda or soda lye the precipitate is transformed into its soda salt. In this way the soda salt of the amidoazo combination formed is obtained, and it is of the following composition:

$$\begin{array}{l} C_6H_3\!\!-\!\!N\!\!=\!\!N\!\!-\!\!C_{10}H_5 \begin{array}{l}\text{CH}_3 \\ \phantom{xx} a)NH_2 \\ \phantom{xx} SO_2ONa \end{array} \\ \phantom{xxxxxxxxxxxxxxxxxxxxx} = C_{34}H_{26}N_6S_2O_6Na_2 \\ C_6H_3\!\!-\!\!N\!\!=\!\!N\!\!-\!\!C_{10}H_5\begin{array}{l} \beta)NH_2 \\ \phantom{xx}CH_3 \\ \phantom{xx}SO_2ONa \end{array} \end{array}$$

This represents a brownish-red amorphous powder, difficult to dissolve in hot water and very difficult to dissolve in cold water. The aqueous solution dyes dark blue by the action of acids, whereas the action of alkalies does not alter it. It dyes cotton not mordanted a splendid alizarine-red in a boiling soap bath, and is somewhat similar in this respect to the dye-stuff invented by Bóttiger, of Lodz, consisting of tetrazo-diphenyl and naphthionic acid of the composition $C_{32}H_{22}N_6S_2O_6Na_2$. It is, however, different from this, not only in chemical composition, but also it produces brighter shades, which are much more constant against acids and light than those obtained by Bóttiger's product. Again, the most trifling part of acetic acid will turn the fiber dyed by Bóttiger's dye-stuff dark-brown to blue-black, whereas this change of color takes place with my product, as described above, only when larger quantities of acetic acid are added.

What I claim as my invention, and desire to secure by Letters Patent, is—

The coloring-matter herein described, which is produced by the action of tetrazo-ditolyl upon the alpha-naphthylamine sulpho-acid by the process herein described, or any process which will produce a like result, substantially as described.

In testimony whereof I have signed my name to this specification in the presence of two subscribing witnesses.

CARL DUISBERG.

Witnesses:
   HERM. MATTHIS,
   RICHARD LEKEBUSCH.

Correction in Letters Patent No. 329,632.

It is hereby certified that in Letters Patent No. 329,632, granted Nov. 3, 1885, upon the application of Carl Duisberg, of Barmen, Prussia, Germany, for an improvement in "Coloring Matter Obtained from Tetrazo-Ditolyl," an error appears in the printed specification requiring correction, as follows: In line 13, the word "toluidine" should be stricken out and the word *tolidin* inserted instead; and that the said Letters Patent should be read with this correction therein that the same may conform to the record of the case in the Patent Office.

Signed, countersigned, and sealed this 23d day of February, A. D. 1886.

[SEAL.]

H. L. MULDROW,
*Acting Secretary of the Interior.*

Countersigned:
M. V. MONTGOMERY,
*Commissioner of Patents.*